Sept. 20, 1938.    J. WELLER    2,130,571
TENSIONING DEVICE FOR TRANSMISSION CHAINS AND THE LIKE
Filed June 25, 1937    3 Sheets-Sheet 2
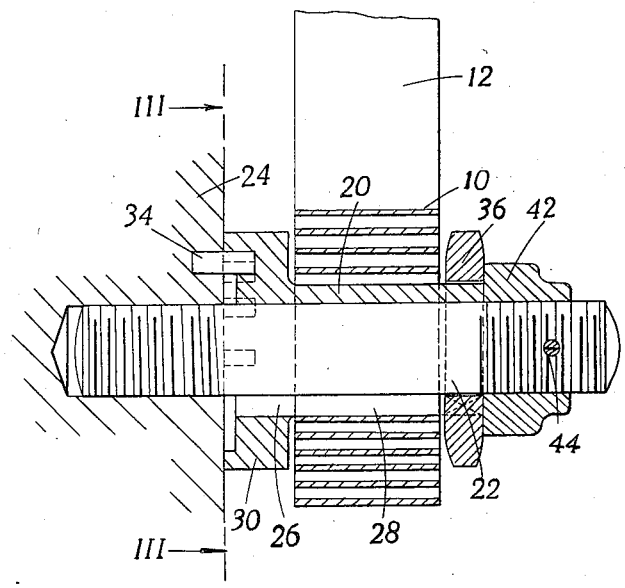
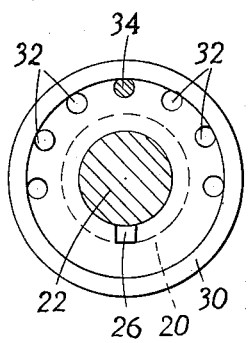
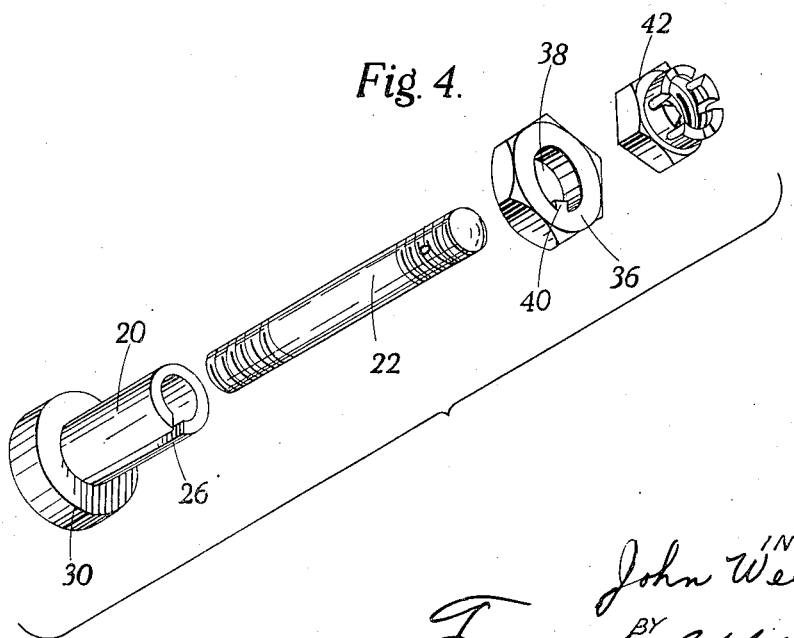

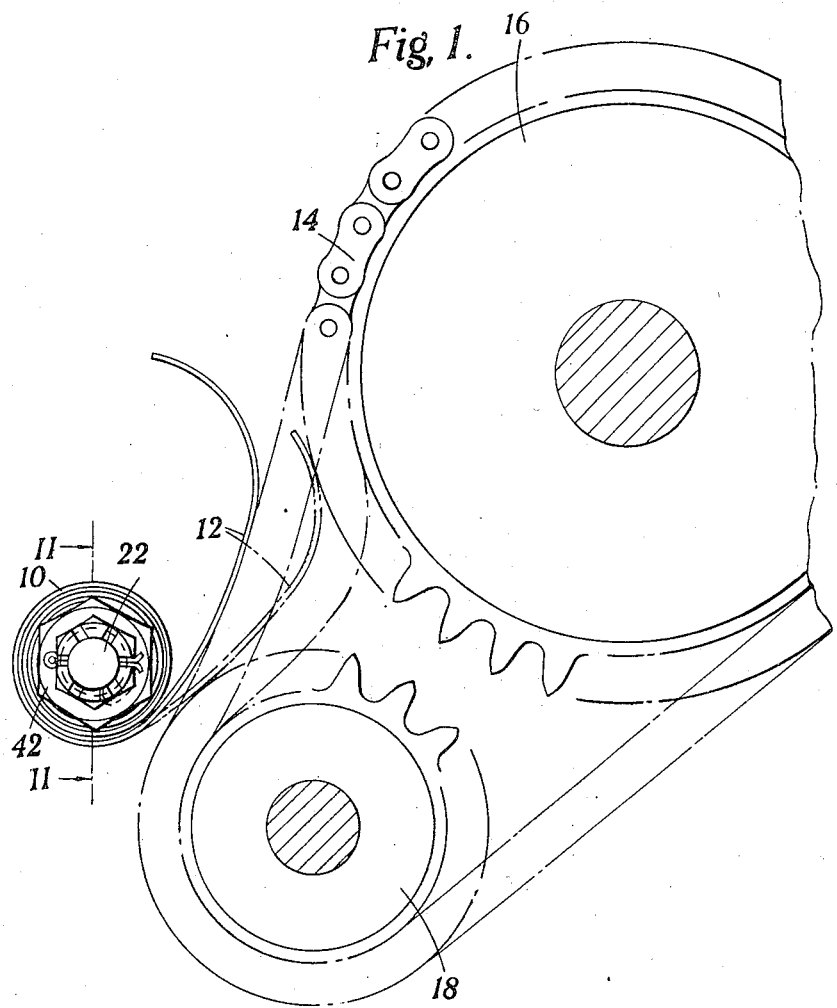

Sept. 20, 1938.  J. WELLER  2,130,571
TENSIONING DEVICE FOR TRANSMISSION CHAINS AND THE LIKE
Filed June 25, 1937  3 Sheets-Sheet 3
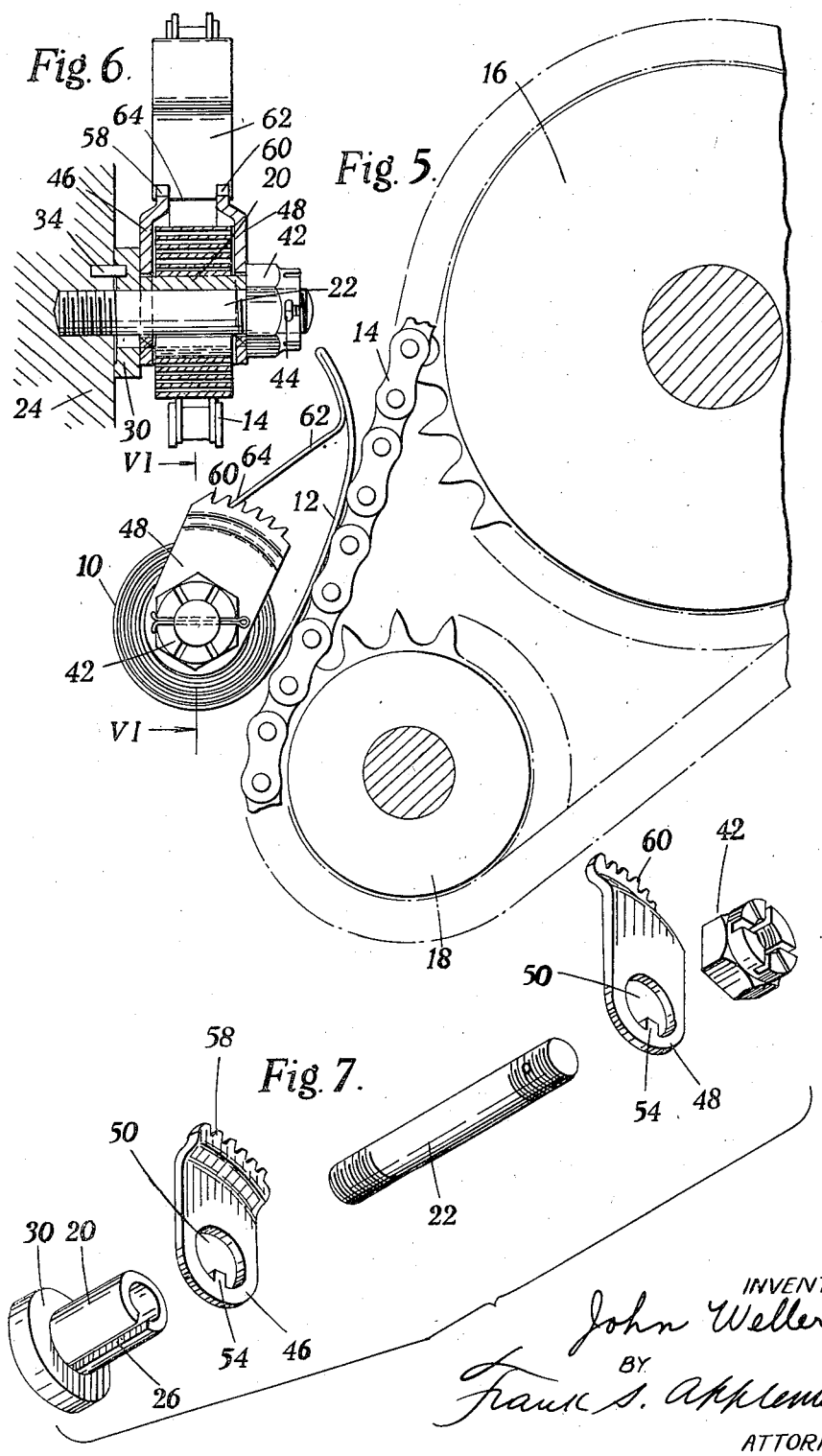

Patented Sept. 20, 1938

2,130,571

UNITED STATES PATENT OFFICE 2,130,571

TENSIONING DEVICE FOR TRANSMISSION CHAINS AND THE LIKE

John Weller, West Horsley, England

Application June 25, 1937, Serial No. 150,391
In Great Britain May 27, 1936

7 Claims. (Cl. 74—242.11)

This invention relates to tensioning devices for transmission chains, belts or like flexible members, of the kind in which a slipper conforming to the curvature of the slack side of the chain or other member is pressed there-against by yielding resilient means.

According to the present invention the slipper is carried by the free end of a spiral spring. In the preferred form of the invention the slipper is constituted by the free end of the spiral spring itself which is suitably curved to fit against the chain or the like according to its varying degree of slackness, the curvature increasing progressively towards the extremity of the spring.

It will be appreciated that the turns of the spiral spring provide a high degree of resilience although the thickness of the spring may be such that its free end constituting the slipper is relatively inflexible. Moreover, the spring may be stressed radially to such an extent that the force exerted by the slipper is substantially constant throughout its range of movement.

According to a further feature of the invention the extremity of the spiral spring co-operates with a ratchet sector to constitute the pawl of a non-return device which prevents the slipper from yielding unduly if there should be a sudden increase of tension in the chain or the like. Preferably the spring is extended beyond the end of the slipper proper, this extension being bent back and inwards towards the spiral part of the spring, the extremity of the extension being presented at a suitable oblique angle to the teeth of the ratchet sector.

Referring to the accompanying drawings,

Figure 1 is a side elevation of a tensioner according to this invention,

Figure 2 is an elevation in section on the line II—II in Figure 1,

Figure 3 is an elevation in section on the line III—III in Figure 2,

Figure 4 is a perspective view of parts of the tensioner disassembled,

Figure 5 is a side elevation of a modified construction according to the invention, Figure 6 is an elevation in section on the line VI—VI in Figure 5, and Figure 7 is a perspective view similar to Figure 4 showing parts of the modified construction disassembled.

Referring first to Figures 1 to 4, a spring 10 consisting of a flat strip of steel bent into spiral form has its free end 12 curved to the shape shown, that is to say, it is nearly straight in the portion near to the spiral and its curvature increases progressively towards its extremity. This portion 12 of the spring constitutes a slipper bearing against the slack side of a chain 14 connecting together two sprocket wheels 16, 18. When the chain is tight the nearly straight portions of the slipper 12 will bear against it but as the slack increases owing to the stretching of the chain the slipper will bear against the chain progressively nearer its extremity and its curvature will therefore conform to the inward bulge of the chain at all times. The properties of a spiral spring are such that a short length of it has considerable stiffness although the spring as a whole may be very yielding. The slipper 12 will therefore maintain its shape substantially unaltered throughout its range of movement and moreover the pressure which it exerts on the chain will be substantially uniform throughout that range.

The spring is supported on a sleeve 20 surrounding a stud 22 screwed into a fixed supporting base 24. This sleeve is slotted longitudinally along one side as indicated at 26 to receive the inwardly bent inner extremity 28 of the spring 10. The sleeve has an enlarged head portion 30 formed with an arcuate row of holes 32 any one of which may receive a pin 34 secured in the base 24, thereby locking the sleeve 20 against rotation and anchoring the inner end of the spring. A hexagonal plate 36 is provided with a central hole 38 fitting over the sleeve 20 and with a nib 40 fitting into the slot 26 and the outer end of the stud 22 is threaded as shown to receive a nut 42 locked by a split pin 44.

When it is desired to adjust the pressure exerted by the slipper the nut 42 is removed, the sleeve 20 is slid outwards clear of the pin 34, the sleeve is turned to the desired position by means of a spanner placed over the flats on the plate 36 and the sleeve is then slid inwards, the pin 34 entering another of the holes 32, the nut being then replaced.

Referring now to Figures 5 to 7, the parts which correspond to parts described with reference to Figures 1 to 4 have the same reference numerals. The hexagonal plate 36 is, however, replaced by two plates 46, 48 formed with holes 50 and nibs 54, these plates being placed one on either side of the spring 10 as shown in Figure 6.

One edge of each of the plates 46, 48 is made arcuate and concentric with the holes 50, and these arcuate edges are formed with ratchet teeth 58, 60. The part 12 of the spring 10 is extended beyond the end of the slipper proper, this extended portion 62 being bent backwards and inwards towards the sleeve 20 so that its extremity 64 co-operates with the teeth 58, 60 in the manner of a pawl. When the chain has slackened to a certain extent the pawl 64 will engage with a new pair of teeth 58, 60 after which the slipper cannot move in the direction away from the chain. A non-return device is therefore provided without additional parts, the plates 46, 48 or one of them at least, being necessary to provide a means of adjustment as described above in connection with the hexagonal plate 36.

It will be appreciated that the very slight resilience possessed by the part 12 of the spring constituting the slipper is not made use of to any appreciable extent and the slipper might be a separate rigid member attached to the spring proper 10. It is, however, more convenient to use a part of the material of the spring itself as the cost is thereby minimized.

I claim:—

1. A tensioning device for a transmission chain, belt or like flexible member, comprising in combination a spiral torsion spring, means for anchoring the inner end of said spring, and a slipper carried by the free end of said spring, said slipper conforming to the curvature of the slack side of said flexible member and being resiliently pressed into contact therewith by said spring, an extension on the free end of said slipper, a ratchet sector mounted to permit the pawl-like engagement therewith of the free end of said extension.

2. A tensioning device for a transmission chain, belt or like flexible member, comprising in combination a spiral torsion spring, means for anchoring the inner end of said spring, and a slipper constituted by the free end of said spring, said slipper conforming to the curvature of the slack side of said flexible member and being resiliently pressed into contact therewith by said spring.

3. A tensioning device for a transmission chain, belt or like flexible member, comprising in combination a spiral torsion spring including a slipper at the free end thereof, means for anchoring the inner end of said spring, said slipper conforming to the curvature of the slack side of said flexible member and being resiliently pressed into contact therewith by said spring, the curvature of said slipper increasing progressively towards its free end.

4. A tensioning device for a transmission chain, belt or like flexible member, comprising in combination a spiral torsion spring, means for anchoring the inner end of said spring, and a slipper constituted by the free end of said spring, said slipper conforming to the curvature of the slack side of said flexible member and being resiliently pressed into contact therewith by said spring, the curvature of said slipper increasing progressively towards its free end.

5. The structure of claim 1, said extension being bent backwardly and inwardly towards the spiral spring, to engage the teeth of said ratchet sector.

6. In a tensioning device for a transmission chain, belt or like flexible member, the combination of a spiral torsion spring, of a fixed spindle, a sleeve supporting said spring and surrounding said spindle, said sleeve comprising means for anchoring the inner end of said spring, locking means for locking said sleeve in any desired angular position and a slipper carried by the free end of said spring, said slipper conforming to the curvature of the slack side of said flexible member, and being resiliently pressed into contact therewith by said spring.

7. The structure of claim 6, said sleeve locking means comprising a base in which said spindle is secured, a pin fixed to said base, and a flange on said sleeve provided with a number of spaced holes in any one of which said pin may be engaged.

JOHN WELLER.